United States Patent [19]

Leggingwell et al.

[11] 3,765,968

[45] Oct. 16, 1973

[54] PROCESS FOR ETCHING POLYMERIC FILMS

[75] Inventors: James W. Leggingwell; Curt Thies; Dennis W. Werkmeister, all of Dayton, Ohio

[73] Assignee: The National Cash Register Company, Dayton, Ohio

[22] Filed: May 15, 1972

[21] Appl. No.: 253,605

[52] U.S. Cl. .......... 156/7, 156/13, 161/6, 161/413

[51] Int. Cl. .......... B44c 1/22

[58] Field of Search .......... 156/3, 7, 8, 13, 156/2; 161/6, 413; 264/343

[56] References Cited

UNITED STATES PATENTS 3,649,391 3/1972 Lewis .......... 156/2 X

*Primary Examiner*—William A. Powell

*Attorney*—E. Frank McKinney et al.

[57] ABSTRACT

A process for etching a film of two polymeric materials is disclosed. The eligible polymeric films are mutually miscible before imaging or etching. Prior to etching, the films are imaged by phase separation. This imaging is accomplished by contacting the films with appropriate solvents. The imaged areas are etched by contact with a liquid such as water or alcohol. The etched films produced by the process of this invention can be employed as a display device or as a printing element.

7 Claims, No Drawings

PROCESS FOR ETCHING POLYMERIC FILMS

This invention relates to a process for the etching of imaged films.

Display devices of a combination of at least two polymeric film-forming materials are disclosed in U.S. Pat. Application Ser. No. 836,021, filed June 24, 1969, now U.S. Pat. No. 3,694,246. The films are produced by dissolving the polymeric materials in an evaporable liquid organic solvent to yield a film-forming solution, casting the solution and evaporating the solvent to yield a body of the polymeric material. The polymeric materials of interest to the present invention are mutually miscible. The resulting cast body is transparent. Imaging is achieved by a change from miscibility to immiscibility. The resulting image is translucent (hazy). One means of accomplishing the change (imaging) is by contacting the films with appropriate imaging liquids. Naturally, the contacting often takes the form of writing or other pre-determined patterns.

It now has been discovered that the imaged areas of these films can be etched away with relatively inert liquids such as water or alcohol. The unimaged areas of the film are unaffected by the liquid as the homogeneous mixture is insoluble in the liquid. If the liquid contains a dye, the imaged areas retain the color, which then can be transferred easily to a sheet of paper by pressure. The etched films produced by the process of this invention can be employed as a display device or as a printing element.

Accordingly, an object of this invention is to provide a process for the etching of imaged films.

Other objects, aspects and advantages of this invention will be apparent to one skilled in the art from the following disclosure and appended claims.

The imaged films employed in this invention can be produced and imaged according to the procedures described in previously mentioned U.S. Pat. Application Ser. No. 836,021 (U.S. Pat. No. 3,694,246) and will not be repeated herein.

To determine if various polymers are mutually miscible, some experimental screening is required. Various polymeric materials are dissolved in a solvent, coated, and dried. Miscibility of the cast film in the solid state then is readily determined by visual inspection, i.e., the film is optically clear. This procedure is more fully described on pages 10 and 11 of previously mentioned U.S. Pat. Application 836,021 (U.S. Pat. No. 3,694,246) and will not be repeated herein.

Specific examples of mutually miscible polymers in films at room temperature and the related solvents are: cholorinated rubber and poly (ethylene-co-vinyl acetate) in benzene, toluene, or carbon tetrachloride; poly (vinyl methyl ether) and chlorinated rubber in 3-methyl-2-pentanone; ethyl cellulose and poly (vinylmethyl ether) in 2-butanone; and polystyrene and poly (vinyl methyl ether) in toluene or perchloroethylene.

Preferably, the films contain 1 to 1, by weight, ratios of the polymers involved. However, the films can have as little as 1 or 2 percent, by weight, of one polymeric material. Generally, the films contain at least 10 percent, by weight, of each polymer employed.

In writing on a substantially transparent film prepared according to the procedure outlined in this patent, the writing solvent is believed to rapidly penetrate the interfacial region of the coating or self-supporting film and swell or partially solubilize the film. If the solvent is sufficiently volatile, it evaporates rapidly, leaving a dry surface behind. Less volatile solvents, of course, require longer evaporation periods but, nevertheless, ultimately leave dry surfaces. In any case, when a film from this invention is contacted with either kind of solvent, even briefly or temporarily, the film is believed to be solubilized or swollen to some extent and a phase separation is believed to be induced in the coating or film. Such phase separation of the polymer materials results in an image, that is, results in turbidity or opalescence in the film in all areas or regions where the coating has been exposed to the solvent material. The image is formed rapidly requiring very little solvent material.

It is in these pahse separated areas where the process of this invention is practiced. The images formed are stable, do not rub off and are an integral part of the coating; however, upon contact with the etching liquid, a portion of the imaged area is removed. One polymer of the phase separated area and the unimaged portion of the cast film are insoluble in the etching liquid.

Solubility and insolubility as used in the process of this invention is defined as follows: solubility is a solubility greater than 4 g./100 cc., preferably greater than 20 g./100 cc. and insolubility is a solubility less than 4 g./100 cc., preferably less than 1 g./100 cc. Specific etching liquids include water, methanol, ethanol, and the like and mixtures. Naturally, to reduce costs, as little etching liquid as possible is employed.

The etching liquid can be applied to the imaged areas by brushing, spraying, dipping and the like for various periods of time depending upon the degree of etch desired. In some instances, physical removal of the etched or soluble polymer is necessary. After such removal, any excess etching liquid is removed by drying. The etching of this invention generally is carried out at room temperature.

The advantages of this invetnion are further illustrated by the following examples. The reactants and the proportions and other specific condtions are presented as being typical and should not be constructed to limit the invention unduly.

EXAMPLE I

A 50/50 mixture by weight of poly (vinyl methyl ether) and polystyrene was cast into a solid film from a toluene solution (10 percent by weight total solids). The resulting transparent film then was written upon with chloroform to yeild imaged areas. The imaged areas were covered with a few drops of water. After a short period of time, the water dissolved away a portion of the imaged areas. The water had no visible effect on the unimaged portions of the film. At room temperature, poly (vinyl methyl ether) is soluble in water and polystyrene is not. Thus run was carried out at room temperature with room temperature water. After the etching process, a clearly visible indented area remained in the imaged-etched areas.

EXAMPLE II

A 50/50 mixture by weight of poly (vinyl methyl ether) and chlorinated rubber was cast into a solid film from a 3-methyl-2-pentanone solution (10 percent by weight total solids) at room temperture. The clear, visually miscible film was imaged with chloroform. The imaged areas were covered with water for a short period of time and a portion of the imaged area was etched away. Mechanical rubbing was used to accelerate the etching process. This entire run was carried out at room temperature. The imaged area of this sample was completely removed by the etching and rubbing.

EXAMPLE III

Another film was prepared and imaged using the materials and procedures of Example II. This sample was immersed in pure ethanol. Within five minutes, one could see the imaged areas dissolving. The imaged areas were completely removed with a light rubbing action. The film was dried to its original clear nature.

EXMAPLE IV

Another film was prepared using the materials and procedures of Example II, except that the film was imaged with trichloroethylene. The imaged film then was flooded with liquid mixture of ethanol and an oil, yellow dye solution for about 2 minutes at room temperature. Excess liquid was wiped from the sample and the imaged, etched side was placed against a sheet of paper. From the imaged area, a distinct transfer of yellow dye occured upon the application of slight hand pressure. A total of three images were transferred.

EXAMPLE V

This run was carried out in a manner identical to Example IV except that a brilliant cresyl blue replaced the yellow dye. Three blue images were produced on a sheet of paper from a single ethanol/dye mixture soak.

EXAMPLE VI

A 50/50 mixture by weight of chlorinated rubber and poly vinylacetate was cast into a solid film from a toluene solution (10 percent by weight total solids) at room temperature. The resulting clear film was imaged with chloroform. The imaged areas with about a 55/45 mixture of ethanol and water at room temperature. After about 3 minutes, light rubbing by hand and spatula completely removed the imaged area. The 50/50 mixture of ethanol/water was used for the etching process, since the mixture is a solvent for poly (vinyl acetate) and a nonsolvent for chlorinated rubber. The mixture had no visible effect on the unimaged area of the film.

Although this invention has been described in considerable detail, it must be understood that such detail is for the purposes of illustration only and that many variations and modifications can be made by one skilled in the art without departing from the scope and spirit thereof.

What is claimed is:

1. An etching process comprising the steps of:

a providing a cast solid film of two polymeric materials wherein the two polymers are mutually miscible and the film is optically clear, wherein at least one of the polymeric materials undergoes a phase separation with respect to the other polymeric material on the application of a phase separation solvent and wherein the phase separation solvent has been applied to a portion of the cast solid film; and b applying an etching liquid to at least the portion of the cast solid film which has been phase separated, wherein one of the polymeric materials is soluble in the etching liquid and the other polymeric materials is insoluble in the etching liquid.

2. A process according to claim 1 wherein the two polymeric materials are chlorinated rubber and poly (ethylene-covinyl acetate), poly (vinyl methyl ether) and chlorinated rubber, ethyl cellulose and poly (vinyl methyl ether), or polystyrene and poly (vinyl methyl ether).

3. A process according to claim 1 wherein the etching liquid is water, alcohol or a mixture thereof.

4. A process according to claim 1 wherein the etching liquid is water, methanol, ethanol or a mixture thereof.

5. A process according to claim 1 wherein the etching liquid is carried out at room temperature.

6. A process according to claim 1 wherein at least a portion of the phase separated cast solid film is removed.

7. A process according to claim 1 comprising the additional step (c) of removing excess etching liquid.

* * * * *

UNITED STATES PATENT OFFICE

CERTIFICATE OF CORRECTION

Patent No. 3,765,968 Dated October 16, 1973

Inventor(s) James W. Leffingwell, Curt Thies and Dennis W. Werkmeister

It is certified that error appears in the above-identified patent and that said Letters Patent are hereby corrected as shown below:

At Item [75] and immediately beneath Item [19] on the front page, "Leggingwell" should be ---Leffingwell-- so that the first-named inventor can be correctly identified as James W. Leffingwell.

Signed and sealed this 19th day of February 1974.

(SEAL)
Attest:

EDWARD M.FLETCHER,JR.
Attesting Officer

C. MARSHALL DANN
Commissioner of Patents